United States Patent
Zander et al.

[11] Patent Number: 6,141,500
[45] Date of Patent: Oct. 31, 2000

[54] CONTROL METHOD FOR DUTY-CYCLING A CAMERA

[75] Inventors: Dennis R. Zander; Ronald J. Rank, both of Penfield, N.Y.

[73] Assignee: Eastman Kodak Company, Rochester, N.Y.

[21] Appl. No.: 09/193,096

[22] Filed: Nov. 16, 1998

[51] Int. Cl.[7] .................................................. G03B 17/24
[52] U.S. Cl. ............................................ 396/263; 396/266
[58] Field of Search .............................. 396/48, 155, 213, 396/263, 266, 387, 406, 410, 536

[56] References Cited

U.S. PATENT DOCUMENTS

| | | |
|---|---|---|
| 3,580,152 | 5/1971 | Engelsmann et al. . |
| 3,675,556 | 7/1972 | Rigolini . |
| 4,332,448 | 6/1982 | Zawodny . |
| 4,479,705 | 10/1984 | Tamamura et al. . |
| 5,446,513 | 8/1995 | Sato . |
| 5,895,132 | 4/1999 | Asakura et al. ..................... 396/213 |

*Primary Examiner*—David M. Gray
*Attorney, Agent, or Firm*—Francis H. Boos, Jr.

[57] ABSTRACT

A camera is enabled by film present and film door sensor switches to perform dry cycle operation for testing of camera operation only when film is not present and the film door sensor switch indicates that the film door is open. Provision is made to bypass a film rewind operation at the end of a dry cycle test operation.

5 Claims, 2 Drawing Sheets

CONTROL METHOD FOR DUTY-CYCLING A CAMERA

FIELD OF THE INVENTION

The invention relates generally to the field of photographic cameras and in particular to a method of controlling dry-cycle operation of a photographic camera.

BACKGROUND OF THE INVENTION

In photographic cameras, it is desirable to be able to test for proper operation of the camera shutter, flash and motor drive by depressing the shutter release button to cycle the camera through a normal sequence of operation but without film in the camera. This is referred to as a dry-cycle operation. U.S. Pat. Nos. 3,580,152; 3,675,556; 4,332,448 and 4,479,705 are exemplary of prior art techniques that allow a shutter to be operated for demonstration purposes when no film is in the camera. On the other hand, from the standpoint of the typical camera user, it is desirable not to have the camera operate when there is no film in the camera since the user is likely to be misled into thinking pictures are being taken when, in fact, that is not the case.

It is therefore an object of the present invention to provide a method of camera control which allows dry-cycle operation of the camera under certain conditions but prevents dry-cycle operation under a camera condition that would normally exist when a typical camera user is taking or attempting to take a picture.

SUMMARY OF THE INVENTION

In accordance with the invention, therefore, there is provided a method of controlling dry-cycle operation in a photographic camera comprising providing in the camera an access door sensor switch which indicates whether the camera door is opened or closed; providing a film present switch which indicates whether film has been loaded into the camera; and, in response to actuation of a shutter release button in the camera, testing conditions of said camera door sensor switch and said film present switch, and if film is not present, enabling dry cycle operation comprising shutter operation, motor drive and, for a camera with flash, flash operation only when the film door is in the open condition. The camera film access door may be a camera back or merely a film chamber door.

In a further aspect of the invention, camera apparatus is provided which comprises a film present switch to indicate presence or absence of film in the camera; a film door switch; and a film door sensor switch to indicate an open or closed condition of the film door. The camera includes a microprocessor that is programmed to respond conjointly to the film present switch and the door sensor switch to enable dry cycle operation of the camera, when film is absent from the camera, only when the film door is in an open condition. By "open" is meant that the door is either opened to a position that would allow access to film in or that a camera door latch which secures the door in the closed position is in the unlatched position. In this way, manufacturing tests or repair dry-cycle testing can be conducted simply by opening or unlatching the camera door.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
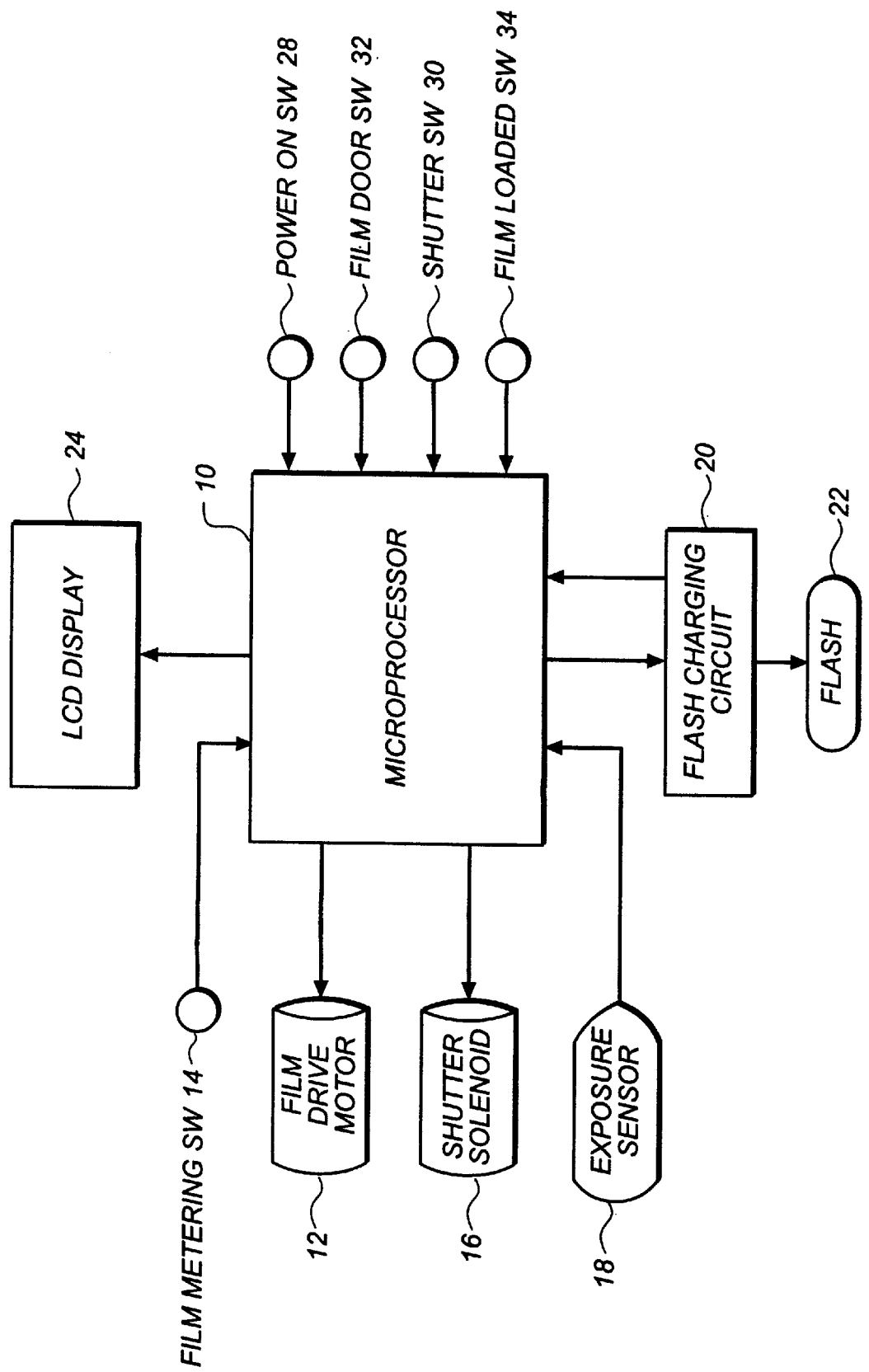
FIG. 1 is block functional diagram of camera control and operating components used in the method and apparatus of the invention.

In FIG. 1, camera apparatus illustrated therein includes a microprocessor 10 which controls the various operating functions of a photographic camera. A film drive motor 12 operates to transport the film across a camera film gate (not shown) and to rewind the film at the end of the film strip. Film metering switch 14 senses position of the film during film transport and signals the microprocessor to stop film during frame-to-frame film advance and is also used at the end of the film strip to indicate that film rewind is required. Shutter solenoid 16 is controlled by the microprocessor to actuate opening and closing of the taking lens shutter (not shown). Exposure sensor 18 responds to scene light level to provide input to the microprocessor for determining camera exposure settings as part of the picture taking function. Flash charging circuit 20 and flash unit 22 are controlled by the microprocessor to provide flash illumination for low scene light conditions or for fill flash purposes. An LCD display unit 24 displays camera operating information to the user. A power ON switch 28 is operated by the user to initialize the camera and provide power to various operating components in the camera. Shutter switch 30 is actuated by a user-operated shutter release button (not shown) to initiate a picture taking sequence which includes actuation of the shutter solenoid 16, film drive motor and, when appropriate, flash charging circuit 20 and flash unit 22. A film door switch 32 responds to opening or unlatching of the film door to indicate to the microprocessor the condition of the door as being opened or unlatched depending the particular design of the camera. Film loaded switch 34 is a sensor switch, usually in the film path near the film gate, that indicates that film has been properly loaded and advanced to the film gate in readiness for picture taking. Except for the method of the invention described below, the design and operation of the various camera components just described are well known in the art and need not be described in further detail.

Figure 2:
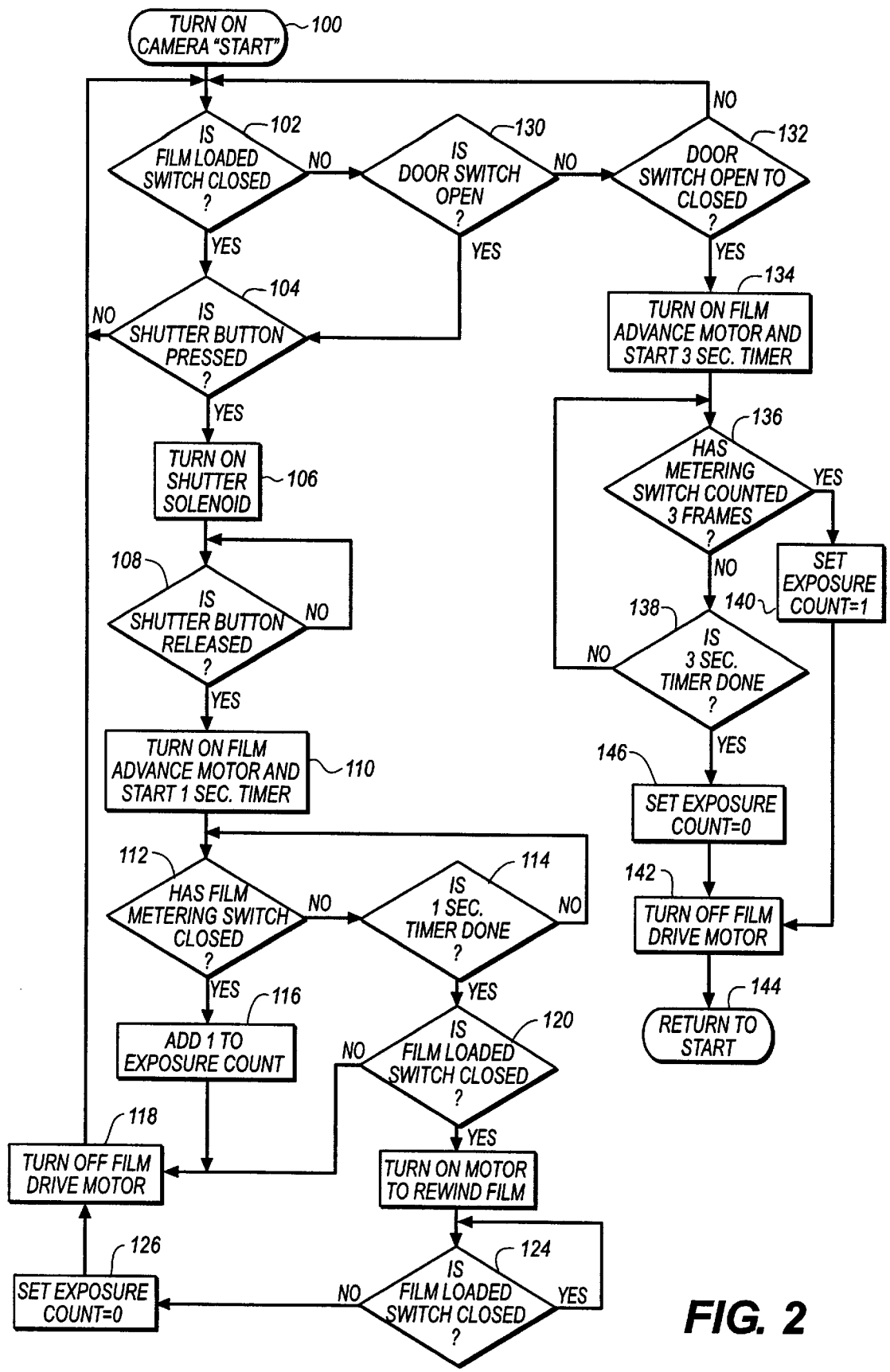
FIG. 2 is a program flow diagram illustrating the operation of the invention in the camera of FIG. 1.

Turning to FIG. 2, there is shown a program flow chart for microprocessor 10 pertaining to operation of the camera in accordance with the invention. When the camera is turned ON at step 100 by closure of power ON switch 28, step 102 tests to see of the film loaded switch 34 is closed which would indicate that film has been properly loaded previously and the camera is ready for normal picture taking operation. If yes, step 104 tests the shutter switch 30 for closure by user actuation of the shutter release button. If not, the routine cycles back through step 102 until closure is sensed, at which time step 106 actuates the shutter solenoid 16 for the predetermined shutter open time. Upon completion of the exposure, step 108 tests the shutter switch 30 until it is opened, indicating the shutter button has been released. Step 110 turns on the film drive motor 12 and starts a one second timer in microprocessor 10 to time closure of the film metering switch 14. If the metering switch closes within one second, as determined by steps 112 and 114, the exposure count is incremented by a count of one at step 116, the drive motor is turned off at step 118 and the routine returns to the input of step 102 to await the next user initiated camera operation. Returning to steps 112 and 114, if the one second times out before the meter switch 14 closes as indicated by the affirmative response to test step 114, the routine moves to test step 120 which confirms that the film loaded switch 34 is closed (previously determined in this case at input step 102) whereupon the film drive motor is reversed at step 122 to initiate film rewind. Step 120 is redundant in this instance but is inserted for reasons of the present invention as will be described below. When step 124 senses the opening of the film loaded switch 34, step 126 resets the exposure count to "0", step 118 turns the drive motor off and the routine returns to the input to step 102. It will be appreciated that what has just been described, with the exception of test step 120 is the normal picture taking cycle for the camera.

Normal film loading cycle is now described. If step 102 detects that the film loaded switch is open, indicating that film has not been loaded into the camera at this stage, the routine moves to test step 130 which determines the opened or closed condition of film door switch 32. Assuming the switch is closed, indicating that the film door is closed, test 132 determines if the door has been recently closed which would normally be the case when after inserting a film cartridge. If so, step 134 starts the film drive motor 12 and starts a three second timer. Step 136 monitors the frame counter in the camera and assuming a count of three is reached before step 138 indicates timeout of the timer, step 140 sets the exposure count to "1", step 142 turns off the film drive motor and step 144 returns the routine to "Start" at the input to step 102 to await the initiation of a picture taking cycle as described above. On the other hand, if step 138 indicates timeout of the three second timer without the frame counter reaching a count of three, which would be the case if the film door were closed without having inserting a cartridge, or if a film jam condition were experienced, the routine would proceed to step 146 to reset the frame count to "0" followed turning off of the drive motor and return to the routine to "Start".

Assuming it is desired to perform a dry cycle operation of the camera for test purposes, test step 130 is inserted at the negative output of test step 102 to determine, when there is no film loaded in the camera, if the film door is open. If the door is open, step 130 shunts the routine back to the normal picture taking cycle described above which allows the dry cycle routine to run. Because the dry cycle can run only in response to conjoint indication of film not present in the camera and the film door being open, the possibility of a typical camera user being misled into thinking that a picture is being taken when no film is in the camera is obviated. It was previously mentioned that test step 120 is inserted following the one second timeout test step 114. This serves the purpose, in the case of dry cycle operation, of moving the routine directly to motor turn off step 118 thereby bypassing the film rewind cycle which would be the normal operation if the one second timeout stage had been reached with film present in the camera.

Thus, by a relatively simple film door sensing operation, a camera can be made to discriminate between a normal camera operation and an intended dry-cycle operation thereby allowing camera functions to be tested without the need for special equipment and at the same time avoiding the possibility that the camera user would be misled into thinking that dry-cycle operation constituted an actual picture-taking event.

The invention has been described in detail with particular reference to certain preferred embodiments thereof, but it will be understood that variations and modifications can be effected within the spirit and scope of the invention.

Parts List 10 micro-processor
12 film drive motor
14 film metering switch
16 shutter solenoid
18 exposure sensor
20 flash charging circuit
22 flash unit
24 LCD display unit
28 power ON switch
30 shutter switch
32 film door switch
34 film loaded switch

What is claimed is:

1. A method of controlling dry-cycle operation in a photographic camera comprising:

provding a film door sensor switch which indicates whether the camera door is in an open or closed condition;

providing a film present switch which indicates whether film has been loaded into the camera; and in response to actuation of a shutter release button in the camera, testing conditions of said camera door sensor switch and said film present switch, and, when film is not present, enabling dry cycle operation comprising shutter operation and motor drive and, for a camera with flash, flash operation only when said film door is in said open condition.

2. The method of claim 1 further including a timeout test effective at the end of a picture taking cycle to indicate an end of roll condition that would normally initiate a film rewind operation and, in response to sensing said film door is in said open condition and to the occurrence of said timeout test, bypassing said film rewind operation.

3. The method of claim 2 wherein the condition of said film present switch is tested after said timeout test to bypass said rewind operation when film is not present in the camera.

4. Camera apparatus comprising:

a film present switch to indicate presence or absence of film in the camera;

a film door;

a film door sensor switch to indicate an open or closed condition of the film door;

a microprocessor programmed to respond conjointly to said film present switch and said door sensor switch to enable dry cycle operation of the camera, when film is absent from the camera, only when said film door is in an open condition.

5. Camera apparatus according to claim 4 further including a timer operative at the end of a picture taking cycle to indicate an end of film condition that initiates a film rewind operation; said microprocessor being further programmed to respond to timeout of said timer at the end of a dry cycle operation to bypass said rewind operation.

* * * * *